United States Patent [19]
Hamilton

[11] 3,883,304
[45] May 13, 1975

[54] METHOD FOR TESTING PREGNANCY

[75] Inventor: Clayton H. Hamilton, Cross Lake, Minn.

[73] Assignee: Conifer Laboratories, Inc., Cross Lake, Minn.

[22] Filed: June 6, 1974

[21] Appl. No.: 476,882

Related U.S. Application Data

[63] Continuation-in-part of Ser. No. 257,016, May 25, 1972, abandoned.

[52] U.S. Cl. .................. 23/230 B; 252/408; 356/39
[51] Int. Cl. ...................... G01n 31/20; G01n 33/16
[58] Field of Search .......... 23/230 B; 252/408, 79.2, 252/101; 356/39

[56] References Cited
UNITED STATES PATENTS 2,796,335   6/1957   Robinson .......................... 252/79.2

Primary Examiner—Joseph Scovronek
Assistant Examiner—Dale Lovercheck
Attorney, Agent, or Firm—Dorsey, Marquart, Windhorst, West & Halladay

[57] ABSTRACT

An improved test for determining the pregnancy status of a female by testing the blood of the woman patient and a test reagent for use in said test, said test including thoroughly mixing the blood of the suspected woman with said test reagent and detecting the extent of agglutination of said blood, said test reagent comprising the combination of a solution of nitric, sulfuric, hydrochloric, or acetic acid and aqueous sodium chloride in concentrations effective to cause agglutination of the blood of a nonpregnant woman but precluding agglutination of the blood of a pregnant woman.

12 Claims, No Drawings

METHOD FOR TESTING PREGNANCY

BACKGROUND OF THE INVENTION

This application is a continuation-in-part of U.S. application, Ser. No. 257,016, filed May 25, 1972 and now abandoned.

The present invention relates generally to an improved pregnancy detection method and more specifically to a method of testing blood for pregnancy.

Prior to the present invention, a number of testing procedures have been used for determining the pregnancy of women. Among these were biological tests commonly referred to as "The Rabbit Test" (also known as the Friedman Test), "The Mouse Test" (also known as the Aschkeim-Zondek or "A-Z Test"), and "The Frog Test". In each of these tests urine from the woman being tested was injected into the respective animal. Because of the high level of human chorionic gonadotropin (HCG) in the urine of pregnant women, the urine from pregnant women affected the animals differently than urine from nonpregnant women. Through the observation of these animals following injection, it was possible to determine the pregnancy of the woman.

Although these tests were reasonably accurate (about 95–98%), they had several serious drawbacks. First, these tests often required several days for completion; secondly, they required the sacrifice of the animal; and thirdly, these tests necessitated animals with specific requirements. For example, the mice had to be immature females of a specific age, the rabbits had to be virgin females, and the frogs could be accurately used as test animals only during certain seasons.

Following these biological tests, a number of immunological and chemical tests were developed for testing the urine of women to determine their pregnancy. Many of these tests, however, had serious drawbacks including the length of time required to complete the test, the complexity of the test, and the length of time it took, following conception (usually about 45 days), to give a positive test. Consequently, there was a real need for a relatively simple, fast and accurate pregnancy test which could be conducted in a physician's office and which could give accurate results as early as two weeks following conception.

SUMMARY OF THE INVENTION

In contrast to the tests disclosed in the prior art, all of which either relied on test animals or consisted of immunological or chemical tests conducted on the urine of the female patient, the present invention relates to a pregnancy test which is conducted on the blood of the female patient.

Accordingly, it is a primary object of the present invention to provide a chemical test for pregnancy in which the blood, rather than the urine, of the woman patient is tested.

Another object of the present invention is to provide a blood test for pregnancy which is accurate and simply administered.

A further object of the present invention is to provide a blood test for pregnancy in which the administration time of the test is very short and in which the woman can find out the results of the test within a matter of minutes.

Another object of the present invention is to provide a test reagent for use in connection with the improved pregnancy test of the present invention, said test reagent including the combination of an acid solution and a saline solution in concentrations effective to cause the blood of a nonpregnant woman to agglutinate but precluding the blood of a pregnant woman from agglutinating.

Still another object of the present invention is to provide a blood test for pregnancy which is capable of accurately indicating a positive result for a pregnant woman as little as two weeks after conception.

These and other objects and advantages will become more apparent with reference to the description of the invention and to the appended claims.

DESCRIPTION OF THE INVENTION

The present invention generally comprises a chemical pregnancy test on the blood of the suspected female patient and includes mixing the blood of the woman patient with a reagent effective to cause the blood of a nonpregnant woman to agglutinate but precluding the blood of a pregnant woman from agglutinating. Whether the blood agglutinates when exposed to the above reagent is visually detected by observing the behavior of the treated blood cells with the aid of a microscope. If the test were negative, the blood cells would be clumped irregularly as a result of the agglutination, whereas, if the test were positive, the blood cells would not agglutinate but would remain evenly distributed. Even though it is suggested that a microscope be used to aid in observing the behavior of the blood cells, many experienced testers may be able to recognize a positive from a negative test with the naked eye.

Generally, the test reagent with which the blood of the woman being tested is mixed is formed by combining specific quantities of an acidic solution of known strength with a physiological saline solution of known strength. More specifically, the test reagent with which the blood is mixed is preferably prepared as follows:

Solution No. I: Prepare a 2.6% solution of nitric acid ($HNO_3$) by combining pure nitric acid with a quantity of distilled water ($H_2O$) sufficient to produce a 2.6% solution.

Solution No. II: Prepare a physiological saline solution by dissolving 0.9 grams of sodium chloride ($NaCl$) in a quantity of distilled water ($H_2O$) sufficient to produce 100 cubic centimeters (cc) of solution.

Solution No. III: Add 10 cc of Solution No. I to a quantity of Solution No. II sufficient to produce a total of 100 cc of solution.

When the reagent identified as Solution No. III above has been prepared, the test for pregnancy is preferably conducted as follows:

1. Place one drop of blood from the suspected patient on a clean slide or a suitable testing surface;
2. Add one drop of reagent (Solution No. III) to the blood;
3. Mix well by rotating the blood on the slide for two minutes;
4. Place a cover slip over the blood and read under a microscope (low power).

If the test is positive, the blood will not agglutinate and the cells will remain evenly distributed. If the test is negative, the blood will agglutinate and the blood cells will be irregularly clumped.

It is believed that the primary function of the acid solution (Solution No. I) in the final reagent is to promote the agglutination or clumping of the blood whereas the primary function of the physiological saline solution (Solution No. II) is to retard or prevent the blood from agglutinating. As a result of extensive testing by varying the concentrations of both the acid and saline solutions, the inventor has been able to prepare a solution with an acidic and saline content which is effective to cause the blood of a nonpregnant woman to agglutinate but which does not cause the blood of a pregnant woman to agglutinate.

Also, the inventor has established the relative and absolute concentrations of acid and saline solutions necessary to prepare the final reagent (Solution No. III) which will give acceptable pregnancy test results. For example, the inventor has found that using the reagent preparation procedure described above, a 1.5% solution of nitric acid ($HNO_3$) as Solution No. I will work sufficiently well but percentages lower than 1.5% will begin to give false negative results because the acid solution is too diluted, in the presence of the saline solution, to agglutinate the blood of many nonpregnant women. Likewise, the inventor has found that a 3.5% nitric acid solution will work sufficiently well but percentages higher than 3.5% will tend to give false positive results because the reagent will agglutinate the blood of some pregnant women. The inventor has found that with nitric acid concentrations above 7% and below 1%, little, if any, conclusions can be reached regarding the test results.

In a similar manner, the inventor has found that using the reagent preparation procedure described above, a saline solution (Solution No. II) formed by dissolving as little as 0.7 grams of sodium chloride (NaCl) in 100 cc of distilled water will work sufficiently well to detect pregnancy but a solution prepared by dissolving less than 0.7 grams of NaCl in 100 cc of water will permit the blood to agglutinate too readily, thus tending to give false results in some women. Likewise, the inventor has found that a saline solution (Solution No. II) formed by dissolving as much as 1.2 grams of NaCl in 100 cc of water will work sufficiently well but amounts greater than 1.2 grams will prevent the blood of some nonpregnant women from agglutinating, thus giving some false results.

As indicated above, the method of the present invention involves placing a drop of the patient's blood and a drop of the test reagent on a slide, mixing well, and then observing whether or not the blood agglutinates. Specifically, the test reagent has been described as resulting from the combination of nine parts of a solution prepared by dissolving between .7 grams and 1.2 grams of sodium chloride (NaCl) in 100 cc of water with one part of a 1.5 to 3.5% solution of nitric acid ($HNO_3$). Preferably, the test reagent is a result of the combination of nine parts of a solution prepared by dissolving 0.9 grams of sodium chloride in 100 cc of water with one part of a 2.6% solution of nitric acid. The resulting solution III or test reagent therefore contains dissolved sodium chloride (NaCl) in the ratio of approximately between 0.63 grams to 1.08 grams per 100 cc of test reagent and contains nitric acid in the approximate percentage of between 0.15 and 0.35%. Preferably the resulting Solution III or test reagent contains dissolved sodium chloride in the ratio of approximately 0.81 grams per 100 cc of test reagent and contains nitric acid in the approximate percentage of 0.26%.

It should be noted that although the above mentioned ranges of nitric acid ($HNO_3$) and sodium chloride (NaCl) concentrations give results with acceptable accuracy, there is a greater tendency for false negative results as the $HNO_3$ concentration is increased above 2.6% and the NaCl concentration is decreased below 0.9 grams per 100 cc of water and a greater tendency for false positive results as the $HNO_3$ concentration is decreased below 2.6% and the NaCl concentration is increased above 0.9 grams per 100 cc of water. Consequently, for best results, the reagent (Solution No. III) should be prepared in accordance with the procedure described above by combining one part of the acid solution (Solution No. I) with nine parts of the saline solution (Solution No. II).

In addition to nitric acid ($HNO_3$), it has been found that other acids such as sulfuric acid ($H_2SO_4$), hydrochloric acid (HCl) and acetic acid ($C_2H_4O_2$) may be used in the preparation of the acid solution (Solution No. I). In the tests conducted on these acids, it has been found that, like nitric acid, a concentration of 2.6% works best. The principle drawback of using sulfuric acid, hydrochloric acid and acetic acid however, is that they are relatively unstable when combined with the saline solution (Solution No. II) to form Solution No. III. Consequently, the shelf life of a reagent prepared from these acids is relatively short. In contrast, the shelf life of the reagent (Solution No. III) prepared from nitric acid is in excess of several months. Also, it has been found with respect to each of these additional acids that, similar to nitric acid, concentrations above 3.5% or below 1.5% will begin to give false results, and concentrations above 7% or below 1% would be incapable of providing any useable test results. It is also believed that saline solutions other than sodium chloride which tend to retard the agglutination of blood and which do not react adversely with the acid solution being used may be used in the preparation of the test reagent.

When using each of sulfuric, hydrochloric or acetic acids to prepare the Solution III or test reagent, the procedure is similar to that described when using nitric acid. For example, a 1.5 to 3.5% solution, or preferably a 2.6% solution, of such acid is prepared and combined with Solution II in a ratio of approximately one part of such acid solution to nine parts of Solution II. Similarly, as when nitric acid is used, the resulting Solution III or test reagent contains dissolved sodium chloride in the ratio of approximately between 0.63 grams to 1.08 grams per 100 cc of test reagent and contains sulfuric, hydrochloric or acetic acid in the approximate percentage of between 0.15 and 0.35%. Preferably, the test reagent would contain 0.81 grams of sodium chloride per 100 cc of test reagent and contains sulfuric, hydrochloric or acetic acid in the approximate percentage of 0.26%.

Although the testing procedure described above is quite specific, it is possible to obtain accurate test results with a varied testing procedure. For example, although the mixing step calls for rotating the blood on the slide for two minutes, any method for thoroughly mixing the blood with the reagent may be employed. Further, although the preferred testing procedure calls for adding one drop of reagent to one drop of blood, it is possible to obtain adequate results by using varying portions of either the blood or the reagent within certain limits. For example, two or three drops of blood with one drop of reagent or vice versa would still give satisfactory results; however, combining the two materials in a ten to one ratio would give unacceptable results or results which would not be capable of detection. Finally, although the preferred testing procedure calls for visually observing the treated blood cells under a microscope, many experienced testers may be able to detect the results of the test with the naked eye.

The testing procedure of the present invention using the reagent (Solution No. III) prepared in accordance with the preferred method, has been conducted on the blood of in excess of 600 women of later known pregnancy status for the purpose of experimentally determining the accuracy of the preferred testing procedure. In each case, the testing procedure of the present invention correctly indicated such pregnancy or lack of pregnancy. In fact, in at least two instances in which the present test results differed from the results of other tests conducted on the urine of the patient, it was found that the present test correctly determined the pregnancy status of the woman where the other tests failed. Further, it has been found, as a result of talking with the patient, that the present test was capable of detecting pregnancy as early as two weeks after conception.

Although the description of the present invention has been quite specific it is contemplated that various acid and saline solutions may be substituted for the nitric acid and sodium chloride solutions called for by the preferred reagent preparation procedure and that the preferred testing procedure may be varied without deviating from the spirit of the present invention. Consequently, it is intended that the scope of the present invention be dictated by the appended claims rather than the detailed description of the invention.

I claim:

1. A method of testing female blood to determine pregnancy comprising the steps of placing a small amount of said blood and a small amount of a test reagent on a testing surface, said test reagent comprising dissolved sodium chloride in the approximate ratio of between 0.63 and 1.08 grams per 100 cc of said test reagent and an acid selected from the group consisting of nitric acid, surfuric acid, hydrochloric acid, and acetic acid each in the approximate percentage of between 0.15 and 0.35%, thoroughly mixing said blood and said test reagent, and detecting the extent of agglutination of the blood.

2. The method of claim 1 wherein said test reagent comprises dissolved sodium chloride in the approximate ratio of 0.81 grams per 100 cc of said test reagent and an acid selected from the group consisting of nitric acid, surfuric acid, hydrochloric acid, and acetic acid each in the approximate percentage of 0.26%.

3. The method of claim 1 wherein said test reagent comprises dissolved sodium chloride in the approximate ratio of 0.81 grams per 100 cc of said test reagent and in the approximate percentage of between 0.15 and 0.35%.

4. The method of claim 3 wherein said test reagent comprises dissolved sodium chloride in the approximate ratio of 0.81 grams per 100 cc of said test reagent and in the approximate percentage of 0.26%.

5. The method of claim 1 wherein said blood and said test reagent are combined in substantially equal quantities.

6. The method of claim 1 wherein said blood and test reagent are thoroughly mixed by rotating the blood on the testing surface for two minutes.

7. The method of claim 1 wherein the extent of agglutination of said blood is detected by visual observance.

8. The method of claim 7 wherein the extent of agglutination of said blood is determined by visually observing said blood under a microscope.

9. The method of claim 1 wherein said test reagent is prepared by combining nine parts of a sodium chloride solution prepared by dissolving sodium chloride in water in the approximate ratio of between 0.7 and 1.2 grams of sodium chloride per 100 cubic centimeters of water with one part of a solution selected from the group consisting of 1.5 to 3.5% nitric acid, 1.5 to 3.5% sulfuric acid, 1.5 to 3.5% hydrochloric acid, and 1.5 to 3.5% acetic acid.

10. The method of claim 9 wherein said test reagent is prepared by combining nine parts of a sodium chloride solution prepared by dissolving sodium chloride in water in the approximate ratio of 0.9 grams of sodium chloride per 100 cubic centimeters of water with one part of a solution selected from the group consisting of 2.6% nitric acid, 2.6% sulfuric acid, 2.6% hydrochloric acid and 2.6 acetic acid.

11. The method of claim 1 wherein said test reagent is prepared by combining nine parts of a sodium chloride solution prepared by dissolving sodium chloride in water in the approximate ratio of between 0.7 grams and 1.2 grams of sodium chloride per 100 cubic centimeters of water with one part of a solution of approximately 1.5 to 3.5% nitric acid.

12. The method of claim 11 wherein said test reagent is prepared by combining nine parts of a sodium chloride solution prepared by dissolving sodium chloride in water in the approximate ratio of 0.9 grams of sodium chloride per 100 cubic centimeters of water with one part of a solution of approximately 2.6% nitric acid.

* * * * *